Jan. 2. 1945.     C. E. STRINGER     2,366,295
COUPLER
Filed Nov. 6, 1943
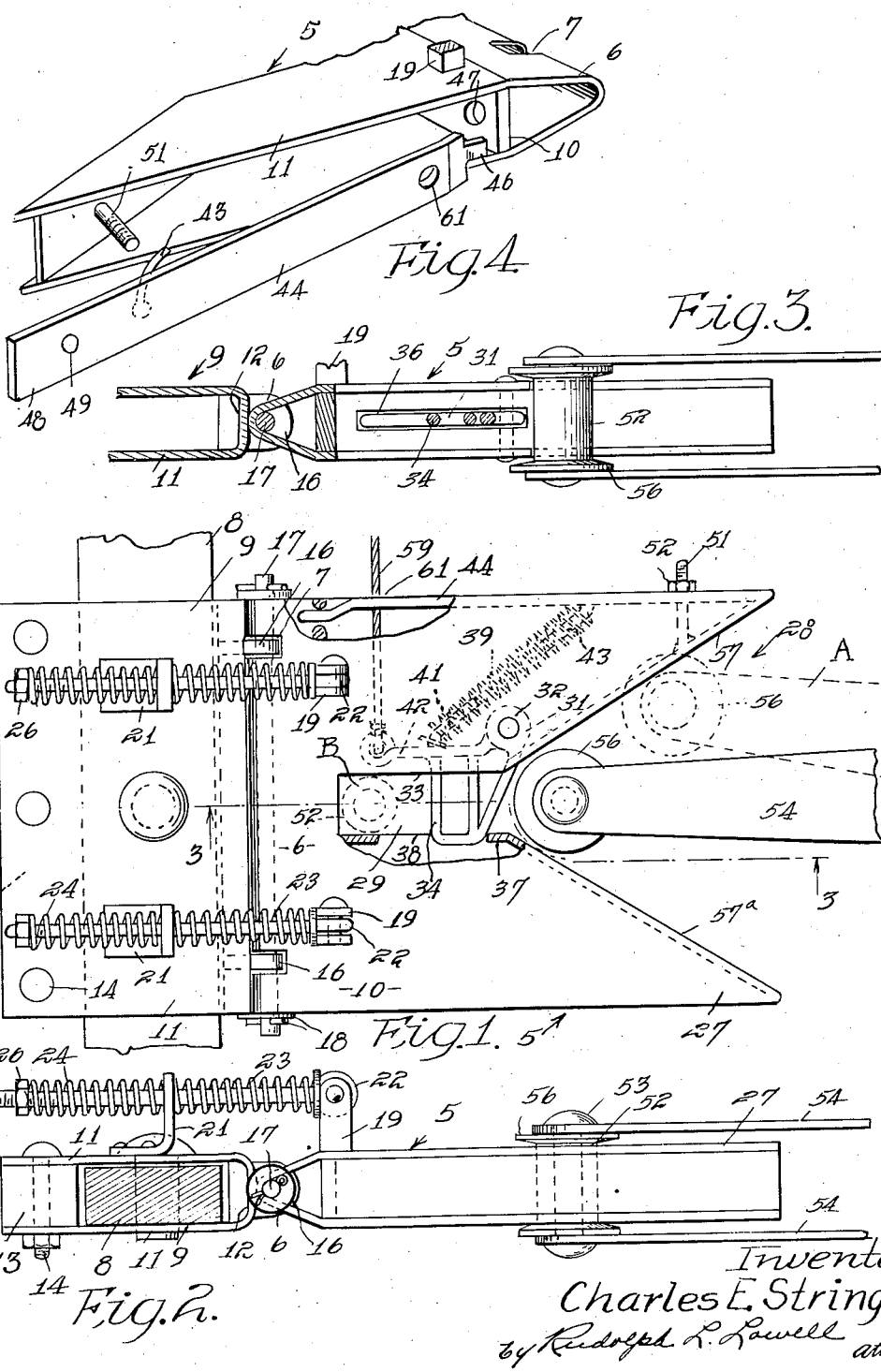
Inventor
Charles E. Stringer
by Rudolph L. Lowell
atty Patented Jan. 2, 1945

2,366,295

UNITED STATES PATENT OFFICE 2,366,295

COUPLER

Charles Edward Stringer, Farnhamville, Iowa

Application November 6, 1943, Serial No. 509,339

5 Claims. (Cl. 280—33.15)

This invention relates generally to coupler devices and in particular to a coupler adapted to automatically connect a tractor unit with a trailer unit on movement of one of such units toward the other within a relatively wide path of travel.

Coupler devices now in general use for connecting a tractor unit with a trailer unit usually require a relative maneuvering of the two units to locate the coupler parts at positions where they can be manually connected. This is particularly true in the connecting of a farm implement with a tractor and necessitates the tractor operator backing up the tractor to the implement and then dismounting to make the coupler connection. As a result appreciable inconvenience and loss of time is encountered. This same inconvenience occurs when a man, additional to the tractor operator, is available to make the manual connection since hand signals and back and forth calling between the man at the coupler and the tractor operator are confused by virtue of obstructing parts between the line of vision of the two men and the exhaust noises from the tractor.

It is an object of this invention, therefore, to provide an improved coupler for connecting a tractor unit and a trailer unit.

Another object of this invention is to provide a tractor-trailer coupler adapted to be connected and disconnected by the tractor operator while he is at a tractor-operating position.

A further object of this invention is to provide a tractor-trailer coupler which can be connected by simply backing the tractor toward the trailer within a relatively wide path of travel.

Yet another object of this invention is to provide a coupler for a tractor unit and a trailer unit in which a coupler part on one of the units is guided to a locking position with a coupler part on the other unit on relative movement between the two units toward each other.

A still further object of this invention is to provide a coupler for a tractor unit and a trailer unit which is automatically connected on movement of the two units toward each other and manually operated to be disconnected on movement of the two units apart from each other, with both the connection and disconnection of the coupler being accomplished while the tractor operator is in a tractor-operating position.

A feature of this invention is found in the provision of a coupler for a tractor unit and a trailer unit in which a flat body member is carried on one of said units in a substantially horizontal plane and formed at one end with an inwardly tapered cut-away portion terminating in a longitudinally extended recess adapted to receive a hitch carried on the other unit. A spring-pressed pivoted keeper is swingable in a path parallel to the body member to a locked position across the open end of the recess. On relative movement of the two units toward each other the hitch enters the cut-away portion and is guided by a side wall thereof to the recess. As the hitch enters the recess it engages and moves the latch from its closed position, with the latch returning to its closed position after the hitch is in the recess.

Another feature of this invention is found in the provision of a coupler including a flat body member pivoted for up and down movement and having a guideway at one end for guiding a vertically extended hitch into a hitch-receiving portion, and a pivoted keeper adapted to be engaged and moved by the hitch out of a locked position as the hitch enters the receiving portion. The keeper is spring actuated to and held in its locking position when the hitch is within the receiving portion. The body member is provided with yieldable means for normally holding it in a substantially horizontal plane, and the support for the hitch is constructed so that it has a free pivotal movement about the hitch and relative to the body member when the hitch is locked in the receiving portion by the keeper.

Further objects, features and advantages of this invention will become apparent from the following description when taken in connection with the accompanying drawing in which:

Fig. 1 is a plan view of the coupler of this invention showing the hitch out of a locked position.

Fig. 2 is a side elevational view of the coupler;

Fig. 3 is a sectional view taken along the line 3—3 in Fig. 1; and

Fig. 4 is a fragmentary perspective view showing the construction of a detail of the coupler body member.

With reference to the drawing the coupler of this invention is shown in Figs. 1 and 2 as including a flat hollow body member 5 having a tapered end portion 6 with a pair of laterally spaced notches 7. A brace or reenforcing bar 10 is extended laterally of and within the body member 5 at its end portion 6. Carried on a draw bar or the like 8 of a tractor unit (not shown) is a supporting member 9 of substantially U-shape, which is laid horizontally on one of its legs 11 and with its leg-connecting portion 12, which constitutes the inner end of the member 9, adjacent the end 6 of the body member 5. The draw bar 8 is inserted between the leg connecting portion 12 and a spacing member 13 located between the free ends of the legs 11 and secured to the legs by bolts 14. Projected outwardly from the end 12 of the supporting member 9 are a pair of eye lugs 16 corresponding to the recesses 7 and adapted to be received therein.

The body member 5 and the supporting member 9 are hinged or pivotally connected together by a rod 17 extended through the body member 5 adjacent the apex of its tapered end 6 and through the eye lugs 16 on the supporting member 9. The rod 17 is held against axial movement by a collar and pin assembly 18 at each end thereof. The body member 5 is normally yieldably retained in a substantially horizontal position and in a plane common with the supporting member 9 by means including a pair of upright U-shaped members 19 spaced laterally of the body member 5 adjacent its end 6. Corresponding to the members 19 and carried on the supporting member 9 are a pair of upright L-shaped bracket members 21. Pivoted between the legs of a member 19 at its looped end is an eye bolt 22 which passes loosely through an opening in a corresponding bracket member 21. A spring 23 is carried on the eye bolt 22 between a member 19 and a corresponding bracket 21, while a second spring 24 is carried on the eye bolt 22 between the bracket member 21 and an adjusting nut 26 which is in threaded engagement with the free end of the eye bolt.

The end portion 27 of the body member 5 is formed with an inwardly tapered cut-away portion 28, which terminates in a recess or opening 29 of substantially rectangular shape extended longitudinally of the member 5. As is clearly indicated in Fig. 1 the outer end of the cut-away portion is of a width substantially equal to the lateral dimension of the body member 5. Located within the member 5, for pivotal movement between the top and bottom sides thereof, is a keeper or latch 31 of a substantially L shape. The pivot 32 for the keeper 31 is located adjacent one side 33 of the recess 29 and adjacent the open end of the recess that is adjacent the junction of the recess with the cut-away portion 28. The leg portion 34 of the keeper 31 is swingable to a locked position across the open end of the recess 29, and to a second or release position within the hollow member 5 through an opening 36 formed in the recess side 33. The locked position of the keeper 31 across the open end of the recess 29 is defined by the engagement of the leg portion 34 against a stop 37 formed on the opposite side 38 of the recess. As best appears in Fig. 1 the stop 37 constitutes one end of a slot formed in the recess side 38 and through which the leg portion 34 of the keeper 31 is extended when it is in its locked position.

Movement of the keeper 31 to its locked position against the stop 37, and its retention in such locked position, is accomplished by the action of a spring 39 of coil type which is supported at one end on a finger element 41 extended outwardly from the leg 42 of the keeper 31, and inwardly of the body member 5. The other end of the spring 39 is supported on a finger element 43 which is projected inwardly of the body member 5 from a removable side plate 44 therefor.

Referring to Fig. 4 the side 44 is shown with an ear 46 at one end, adapted to be received in an opening 47 formed in the brace bar 10 extended transversely of the body member 5 adjacent its end 6. The insertion of the ear 46 within the opening 47 provides a hinged connection at the end 46 with the body member 5, with the opposite end 48 of the member 44 having an opening 49 adapted to receive a bolt 51 secured within the body member 5 and extended laterally outwardly therefrom. On tightening of a nut 52 for the bolt 51 the side 44 is held in a fixed position on the body member 5. By virtue of this removable side 44 and its cooperative assembly with the spring 39 the assembly of the spring and the keeper 31 within the body member 5 is simply accomplished.

The opening 29 is of a width to receive a hitch portion 52 of roller type which is rotatable on a vertical pin 53 connected between vertically spaced arm members 54 extended from a supported position on a trailer unit (not shown). With reference to Figs. 2 and 3 it is seen that the axial length of the roller 52 is greater than the thickness of the body member 5 so as to extend outwardly at each of its ends from the top and bottom of the body member. A collar or spacing member 56 is mounted on the pivot pin 53 between each end of the roller 52 and a corresponding arm member 54, the diameter of the spacers 56, as shown in Fig. 1, being of a length greater than the width of the opening 29.

In connecting the hitch 52 with the body member 5 the body member is held in a substantially horizontal plane by the action of the springs 23 and 24. The tractor, which carries the body member 5 is then backed toward the trailer which supports the hitch 52. The backing of the tractor can take place in a relatively wide path of travel by virtue of the hitch being guided to the opening 29, once the hitch enters the cut-away portion 28. In other words the opening 29 is not brought adjacent to the hitch 52 by a careful maneuvering of the tractor but the hitch is brought to the opening so long as the tractor is operated in a path of travel which will locate the hitch in the cut-away portion 28. Thus on movement of the body member 5 to the right, as viewed in Fig. 1, which movement is accomplished by backing the tractor toward the trailer assume the hitch enters the cut-away portion 28 at its dotted line position indicated at A. At this position the hitch 52 engages and is guided by the side 57 of the tapered cut-away portion 28 to the open end of the recess 29 at which time the hitch is in the full line position shown in Fig. 1. It is apparent, of course, that the side 57a will function similarly to the side 57 in guiding the hitch 52 to the opening 29.

On a continued movement of the body member toward the right the hitch engages the leg portion 34 of the keeper 31 and moves the keeper in a clockwise direction, as viewed in Fig. 1, out of its locked position across the open end of the recess 29. When the hitch 52 reaches approximately its dotted line position indicated at B, the leg portion 34 is moved out of engagement with the hitch by the spring 39 and automatically returned to its locked position against the stop 37. It is seen, therefore, that the hitch 52 is positively locked within the opening 29 and that the pulling force applied on the hitch 52 by the trailer unit is exerted against the leg portion 34 in a manner to more firmly hold it against the stop 37.

If it is desired to release the hitch 52, the tractor unit is backed toward the trailer until the hitch 52 is moved adjacent the closed end of the recess 29 to its dotted line position at B so as to provide clearance to the keeper 31 for free pivotal movement in a clockwise direction out of its locked position. This movement of the keeper is accomplished by manually actuated means including a cable 59 which is extended through an opening 61 in the body member side 44 and connected to the free end of the leg 42 of the keeper 31. An operating lever (not shown) on the tractor is connected with the cable 59 and is carried on the tractor at a position such that it can be manipulated while the tractor operator is in a tractor-operating position.

When the hitch 52 is in its locked position within the recess 29 the collars 56 at each end of the hitch 52 act to maintain the arms 54 in a spaced or clearance relation with the body member 5 so that the body member 5 is movable between the arms 54 on movement thereof out of longitudinal alignment with the arms. That is a collar 56 is constructed for bearing engagement with the top or bottom side of the member 5 and a corresponding arm 54 to keep the arm in a substantially parallel spaced relation with the body member. It is thus seen that a turning of the trailer unit with the tractor unit takes place without any interference between the arms 54 and the body member 5. The springs 23 and 24 provide for a yieldable movement of the body member 5 in an up and down direction to accommodate the travel of the tractor unit and trailer unit over rough and uneven ground. Thus regardless of the relative elevation of the tractor unit and the trailer unit any binding action between the hitch 52 and the body member 5 is completely eliminated.

From a consideration of the above description it is seen that the invention provides a coupler of a simple, inexpensive and rugged construction which operates to automatically connect a tractor with a trailer on backing of the tractor toward the trailer over a wide path of travel and adapted to be manually released, all while the tractor operator is in a tractor-operating position. The construction of the coupler provides for a free relative movement between the tractor unit and trailer unit out of longitudinal alignment with each other and at varying elevations so as to permit of the free operation and maneuvering of the tractor-trailer combination under all conditions of operation. Although the body member 5 has been specifically described with respect to its support on a tractor it is to be understood that it may be carried in a like manner on a trailer unit with the hitch in turn being carried on the tractor unit.

It is to be understood also that although the invention has been described with respect to a preferred embodiment thereof that it is not to be so limited since modifications and changes in the arrangement of its parts can be made in a manner which is within the intended scope of this invention as defined by the appended claims.

I claim:

1. A coupler device for a tractor unit and a trailer unit including a flat body member pivoted at one end on one of said units for pivotal movement up and down from a substantially horizontal plane, means normally yieldably holding said body member in said horizontal plane, said member at the opposite end thereof having an inwardly extending converging recess terminating in a rectangular opening, a latch pivoted on said member adjacent one side of said opening for pivotal movement across said opening to a locked position, resilient means for moving and holding said latch in said locked position, a stop portion on the opposite side of said opening for defining said locked position, and an upright hitch portion supported on the other of said units adapted to be received in said opening, with said recess constituting a guide-way for said hitch portion, and said hitch portion, on entering said opening, engaging and moving said latch against the pressure of said resilient means out of said locked position, with said latch, when the hitch portion is within said opening, being moved by said resilient means out of engagement with the hitch portion to said locked position and forced against said stop by said hitch portion on application of a pulling pressure between said two units.

2. A coupler device for a tractor and a trailer including a flat member pivoted at one end on said tractor for pivotal movement upwardly and downwardly out of a substantially horizontal plane, resilient means normally yieldably holding said pivoted member in said horizontal plane, said member at the opposite end thereof having an inwardly converging recess terminating in a hitch-receiving portion, a hitch carried on said trailer and receivable in said hitch-receiving portion, a pivoted latch, pivot means for said latch supported on said member to one side of said hitch-receiving portion and adjacent to the inner end of said recess, with said latch being pivotally movable to a position across said hitch-receiving portion to lock said hitch therein, a stop at the other side of said hitch-receiving portion arranged substantially opposite said pivot means for defining the locked position of said latch, resilient means for moving and holding said latch in said locking position, with said hitch, on movement of the tractor unit toward said trailer unit, entering said recess and being guided by a side wall thereof into said hitch-receiving portion to engage and move said latch from its locking position, with said resilient means, when said hitch is within said hitch-receiving portion, moving said latch out of engagement with the hitch to said locking position, and the hitch, on application of a pulling pressure between the tractor and trailer, acting to force said latch against said stop.

3. A coupler for connecting a tractor unit and a trailer unit including a supporting member mounted on one of said units, a body member pivotally supported at one end on said supporting member for movement upwardly and downwardly out of a substantially horizontal plane, means normally yieldably holding said body member in said horizontal plane, including a pair of oppositely arranged supports on said supporting member, a pair of spring-carrying members, each said spring-carrying members being slidable in a support and pivotally supported at one end on said body member, a pair of springs mounted about each said spring-carrying members, with said springs arranged in compression to each side of a corresponding one of said supports, said body member having a vertically extended recess therein open to the opposite end of said body member adapted to receive therein a hitch portion carried on the other of said units, a guide portion extended from each side wall of said recess outwardly from said opposite end, said hitch portion, on relative movement of said two units toward each other, being guided by a guide portion into said recess, and a pivoted latch on said body member resiliently urged to a hitch-locking position across the open end of said recess, with said latch being engaged and moved by said hitch out of said locking position as said hitch enters said recess, and movable into said locking position when the hitch is in said recess.

4. A coupler for connecting a tractor unit and a trailer unit including a pivoted flat body member, means pivotally supporting said body member at one end on one of said units for pivotal movement in an up and down direction, tension means connected at one end to said one unit and at its opposite end to said body member adapted to normally hold said body member in a substantially horizontal plane, said body member having a substantially central longitudinally extended vertical opening therein open to the other end thereof, a pair of vertically spaced arm members extended forwardly from the other of said units, an upright hitch supported between the free ends of said arm members, a pivoted keeper on said body member pivotally movable in a direction toward said other end of the body member to a locked position across the open end of said opening, a stop engageable with said keeper to define said locked position, means yieldably moving and holding said keeper in said locked position, said hitch, on entering said opening, engaging and moving said keeper inwardly out of said locking position, with said latch, when the hitch is within said opening, being moved by said yieldable means out of engagement with the hitch to said locked position, said hitch acting to force said latch against said stop on application of a pulling pressure between said two units.

5. A coupler for connecting a tractor unit with a trailer unit including a flat hollow body member having an end portion pivoted on one of said units for up and down pivotal movement, means normally yieldably supporting said body member in a substantially horizontal plane, with the opposite end portion of said body member having an inwardly tapered cutaway portion terminating in a longitudinally extended hitch-receiving recess, a pair of vertically spaced arms projected forwardly from the other of said units, a hitch supported between the free ends of said arms and receivable in said recess, with a side wall of said cut-away portion constituting a guide for guiding said hitch into said recess, a keeper pivotally supported within said body member adjacent one side of said recess with said one side of the recess having an opening therein, and said keeper being pivotally movable through said opening in a direction toward said cutaway portion to a locked position, a stop on the other side of said recess engageable with said keeper to define said locked position, spring means within said body member for moving and holding said keper in said locked position, said hitch on entering said recess, engaging and moving said keeper out of said locked position, manually actuated means for moving said keeper out of said locked position to release said hitch, and a portion at each end of said hitch adapted for bearing engagement with a corresponding arm and flat side of said body member, with the space between said arms providing for the passage of said body member therebetween on pivotal movment of the arms about the hitch when the hitch is in said recess.

CHARLES EDWARD STRINGER.